United States Patent [19]
Hedrick

[11] 3,750,671
[45] Aug. 7, 1973

[54] SURGICAL CUTTING TOOL ADAPTER APPARATUS

[75] Inventor: John R. Hedrick, La Crescenta, Calif.

[73] Assignee: Minnesota Mining and Manufacturing Company, St. Paul, Minn.

[22] Filed: Mar. 31, 1971

[21] Appl. No.: 129,767

[52] U.S. Cl.............. 128/305, 30/276, 142/133 C, 128/310
[51] Int. Cl......................... A61b 17/16, A61b 17/32
[58] Field of Search............... 128/305, 310, 317; 285/257, 322, 319; 30/276; 143/133 C

[56] References Cited
UNITED STATES PATENTS
| | | | |
|---|---|---|---|
| 1,771,764 | 7/1930 | Beattie | 30/276 |
| 1,781,564 | 11/1930 | Beattie | 128/310 |
| 1,227,632 | 5/1917 | Lagerbäck | 285/322 X |
| 3,384,085 | 5/1968 | Hall | 128/305 |

*Primary Examiner*—Aldrich F. Medbery
*Attorney*—Smyth, Roston & Pavitt

[57] ABSTRACT

An adapter apparatus for a cutting tool to permit only transverse cutting movement wherein the attaching section of the adapter apparatus includes a plurality of longitudinal slits, a friction washer located about the slits, a wedging sleeve being adjustably movable into contact with the friction washer to vary the diameter of the attaching section.

11 Claims, 5 Drawing Figures

PATENTED AUG 7 1973 3,750,671
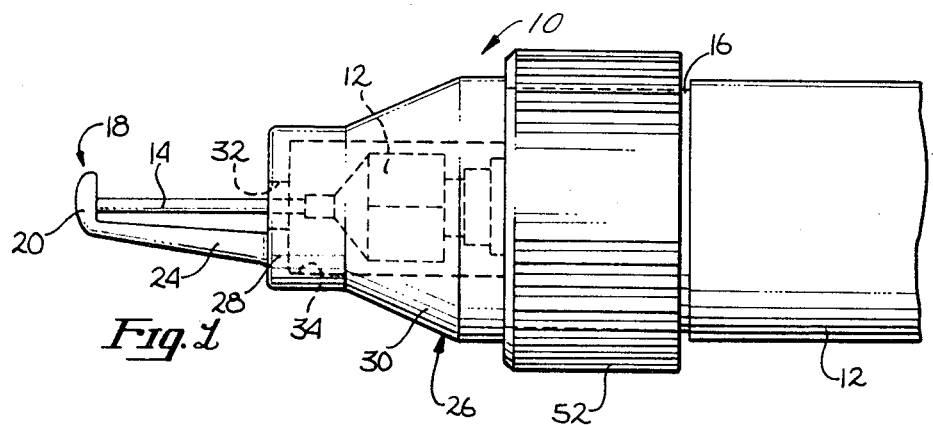
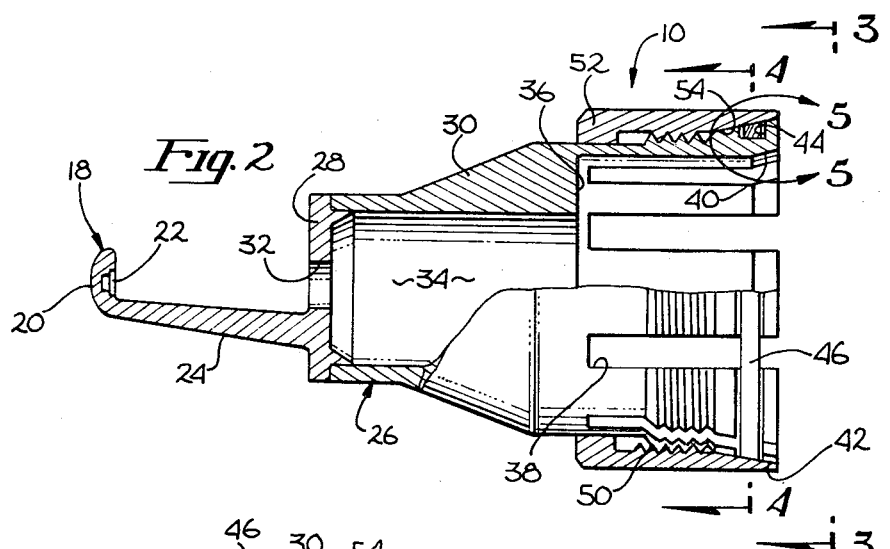
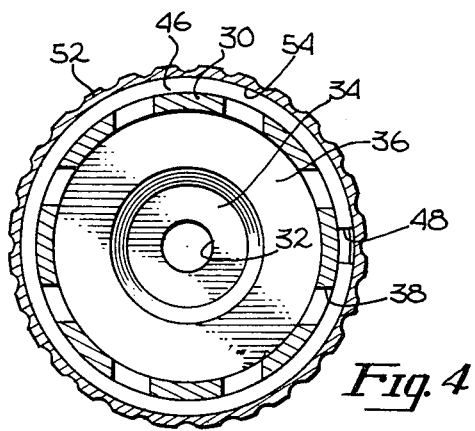
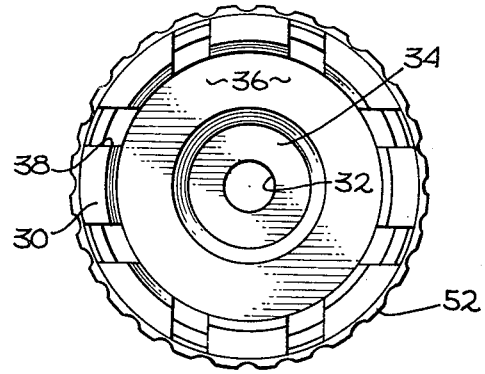
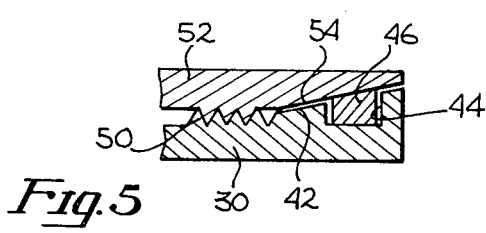
JOHN R. HEDRICK
INVENTOR.
BY Smyth, Roston & Pavitt
ATTORNEYS

SURGICAL CUTTING TOOL ADAPTER APPARATUS

BACKGROUND OF THE INVENTION

In the field of medical surgery it is common to employ the use of a boring type of cutting tool to provide access into the skull of a human being. Such access is desired to effect removal of tumors and other surgical procedures within the skull.

Surrounding the brain and located directly adjacent the skull is a membrane which is called the dura mater (frequently referred to as the dura). This membrane is a tough protective membrane to protect the brain against damage. It is desired to not cut through the membrane except in the desired location.

The normal procedure in operating on the brain provides for the employment of a rotating boring tool. The boring tool is to make a small opening within the skull with the cutting tool not penetrating the dura. The cutting tool is then moved in a transverse direction in a continuous curve thereby resulting in the removing of a segment of the skull. During the transverse movement of the cutting tool, it is important to not penetrate the dura. Since the tip of the cutting tool is specifically adapted for boring into the skull, the surgeon has to carefully control the penetration of the cutting tool to avoid passing through the dura.

Heretofore, it has been known to employ the use of a protective foot device which is located forward of the cutting tool to prevent the cutting tool from passing through the dura. In other words, the surgeon is no longer required to tediously maneuver the cutting tool to avoid undesired penetration of the dura. The foot is installed after the forming of the access hole into the skull and it is desired that the tool only be employed to effect transverse cutting of the skull. The foot also serves the additional function of tending to push the dura slightly away from the interior of the skull during transverse cutting. The foot is normally attached to an adapter apparatus with the adapter apparatus to be fixedly securable to the cutting tool.

The normal procedure is for the adapter apparatus to be secured to the cutting tool by means of a fastener such as a screw or bolt. The primary disadvantage of such a securing means is that a separate tool is required to operate the fastener. The environment in which the adapter apparatus is to be installed is during an extremely dangerous surgical operation where time is of the essence. Normally the surgeon will have the patient's blood upon his gloved hands making it extremely difficult to operate a screw driver or a wrench to effect securing of the adapter apparatus to the rotating cutting tool structure. Because of the slippery condition of the surgeon's gloves, it is difficult to adequately secure the adapter unit to the cutting tool structure.

Also, such previous adapter units have been constructed in a quite complex manner (being formed of a larger number of individual parts). Obviously, the adapter unit is going to be permeated with blood and tissue during use. It has been difficult to effect a satisfactory cleaning of the previous adapter units after usage.

It would be desirable to design an adapter unit to be usable in the above referred to environment which eliminates the need for separate tools to connect the adapter unit to the cutting tool structure, and also is constructed of a small number of parts which facilitated the cleaning of the adapter unit after usage.

SUMMARY OF THE INVENTION

The adapter apparatus of this invention comprises a foot which is to cooperate with the forward portion of the cutting tool. The foot is fixedly secured to a main sleeve with the main sleeve being hollow and the cutting tool passing therethrough. The main sleeve includes an attaching section adjacent its free end thereof. The attaching section includes the use of a plurality of longitudinal slits equidistantly spaced apart about the main sleeve. The main sleeve is also exteriorly threaded in the area of the slits. Located directly adjacent the end of the main sleeve in the area of the attaching section is an inclined portion. An annular recess is formed within the inclined portion and is adapted to cooperate with a friction washer. The friction washer is to be constructed from a plastic material of the composition of polytetrafluoroethylene plastic. A wedging sleeve is to be threadably secured on the main sleeve with the wedging sleeve having a forward wedging section. The wedging section is to cooperate with the inclined portion of the main sleeve to effect a squeezing of the friction washer therebetween. Upon movement of the wedging section of the wedging sleeve upon the inclined portion of the main sleeve, the width of each of the slits in the open end area of the slits is decreased. Therefore, a decrease in the diameter of the main sleeve occurs in the attaching section. As a result, with the adapter apparatus so installed upon a cutting tool structure, the adapter apparatus is frictionally secured to the cutting tool structure in an extremely secure manner.

BRIEF DESCRIPTION OF THE DRAWING

FIG. 1 is a longitudinal view of the adapter apparatus of this invention as it would be installed in combination with a cutting tool apparatus;

FIG. 2 is a partly-in-section view of the adapter apparatus of this invention;

FIG. 3 is an end view of the adapter apparatus of this invention taken along line 3—3 of FIG. 2;

FIG. 4 is a cross sectional view through the adapter apparatus of this invention taken along line 4—4 of FIG. 2; and FIG. 5 is an enlarged cross sectional view of a portion of the adapter apparatus of this invention taken along line 5—5 of FIG. 2.

DETAILED DESCRIPTION OF THE SHOWN EMBODIMENT

Referring particularly to the drawing, there is shown in FIG. 1 the adapter apparatus 10 of this invention being fixedly located upon a cutting tool structure 12. The cutting tool structure 12 includes a rotating cutting tool 14 which is adapted for both boring into the skull of a human being and also cutting transversely within the skull. In other words, the cutting tool 14 has a cutting blade at the front edge thereof and also a cutting blade along its longitudinal exterior surface. Cutting tool 14 is driven by a motor assembly (not shown). The cutting tool structure 12 also includes a stepped area 16, the function of which will be explained further on in the specification.

The adapter apparatus 10 includes a foot 18 having a smoothly contoured outer surface 20. The outer surface 20 is adapted to come into contact with the dura which surrounds the brain and is adapted to be conducted therealong without causing injury to the brain or damage to the dura. The inner surface of the foot 18 includes a recess 22. The recess 22 is adapted to cooperate with the forwardmost edge of the cutting tool 14. The cutting tool 14 is adapted to rotate within the recess 22 in a low-frictional manner. The foot 18 is integrally connected to an extension 24 which is also integrally connected to a main sleeve 26. The main sleeve 26 includes a front plate 28 and a single body 30. An aperture 32 is located within the front plate 28 and communicates with the longitudinal opening 34 formed within the body 30. Opening 34 is substantially cylindrical in configuration and centrally disposed within the body 30. The cutting tool 14 is adapted to pass through the opening 34 and through aperture 32 prior to coming into contact with the recess 22.

The opening 34 is enlarged adjacent the free end of the body 30 to form the shoulder 36. Formed within the body 30, in between the free end of the body and the shoulder 36, are a plurality of longitudinal slits 38. It is to be noted that the slits 38 are formed substantially rectangular in configuration and are to normally be of a width of approximately one quarter of an inch. This thickness is normally rather substantial but has been found to be necessary to facilitate the cleaning of the adapter apparatus 10 of this invention after usage. The slits 38 are equidistantly spaced about the body 30 and extend longitudinally thereof.

The open end 40 of the body 30 terminates in an outwardly inclined portion 42. Formed within the inclined portion 42 is an annular recess 44. Annular recess 44 is adapted to cooperate with a frictional washer 46. Friction washer 46 is split at 48 for a reason which will become apparent further on in the specification. The friction washer 46 is designed to be constructed from a low frictional plastic material such as polytetrafluoroethylene plastic. However, it is to be understood that other types of material could readily be employed without departing from the scope of this invention.

Exteriorly formed about the body 30 in between the inclined section 40 and the shoulder 36 is a threaded section 50. The threaded section 50 is adapted to threadingly cooperate with the wedging sleeve 52. Wedging sleeve 52 is adapted to encircle the body 30 in substantially a tight fitting manner. However, the wedging sleeve 52 is capable of being disassociated from the main sleeve 26 by means of withdrawing the wedging sleeve 52 out of of contact with the threaded section 50 and moving it past the foot 18. The wedging sleeve 52 includes a beveled section 54. Beveled section 54 is adapted to matingly cooperate with the inclined portion 42 of the body 30.

The operation of the adapter apparatus 10 of this invention is as follows: It will be assumed that the forward portion of the cutting tool 14 has been employed to bore a hole into the skull of sufficient size to permit entry of the foot 18 into the bore and into contact with the dura. The adapter apparatus 10 is then installed upon the cutting tool apparatus 12 until the forward edge of the cutting tool 14 cooperates within recess 22. The wedging sleeve 52 is then rotated with respect to the main sleeve 26 by means of the threaded section 50. The movement of the wedging sleeve 52 is to effect a slight compression of the friction washer 46. As a result, the sections of the body 30 located in between the slits 38 are caused to be moved radially inward into frictional abutting contact with the stepped portion 16 of the cutting tool apparatus 12. Also, the shoulder 36 should be located in abutting contact with the forward edge of the stepped portion 16. Because of the low frictional quality of the friction washer 46, movement of the wedging sleeve 52 with respect to the main sleeve 26 is facilitated. However, the frictional engagement of the body 30 with respect to the stepped portion 16 is not impaired. The wedging sleeve 52 is to be moved sufficiently until it is believed that adequate binding force is obtained between the body 30 and the stepped portion 16. Upon the above movement of the wedging sleeve, the diameter of the body 30 in the area of open end 40 decreases. During such decrease in diameter, the split 48 formed within the friction washer 46 is decreased in size. Therefore, the split 48 must be employed to insure satisfactory operation of the friction washer 46.

Upon it being desired to remove the apparatus 10, it is only necessary to effect reverse rotational movement of the wedging sleeve 52 with respect to the main sleeve 26 until a release of the binding force between the body 30 and the stepped portion 16 occurs. The apparatus 10 then is to be removed from the cutting tool structure 12 thereby making the cutting tool 14 ready for a boring operation.

What is claimed is:

1. A surgical tool assembly including a combination providing a frictional connection between a first member and the end of a second member having a generally longitudinal configuration, comprising:

portions of the first member defining at least a pair of slits extending longitudinally on the first and second members;

a sleeve movable on the first member to force the portions of the first member into the second member to form a frictional connection therebetween;

a washer disposed between the sleeve and the portions of the first member and having characteristics providing a coefficient of friction between the sleeve and the first member less than the coefficient of friction between the sleeve and the portions of the first member.

2. The combination recited in claim 1 wherein portions of the sleeve define a wedge which is, movable in a first direction to engage the washer and further movable in the first direction to force the portions of the first member into the second member.

3. The combination recited in claim 1 wherein said first member is in a fixed relationship to said second member, and
said sleeve being received in threaded engagement over said first member.

4. The combination recited in claim 1 wherein said washer is split to permit contraction of the free ends thereof as the portion of said first member moves into frictional connection with said second member.

5. The combination recited in claim 1 wherein said first member is an adapter including a foot at the end thereof remote from said sleeve.

6. The combination recited in claim 1 wherein said washer is of polytetrafluoroethylene.

7. The combination recited in claim 1 wherein said washer is trapezoidal in cross-sectional shape.

8. The combination recited in claim 5 wherein first member includes means forming a body portion over which said sleeve is positioned,
  said foot extending from said body member remote from said slits, and
  means in said body member forming an aperture for receiving a tool element.

9. The combination recited in claim 1 wherein said first member includes means forming a body portion over which sleeve is positioned, and means in said body member forming an aperture for receiving a tool element.

10. The combination recited in claim 1 wherein said washer is disposed in a substantially fixed relationship with respect to the said portions of said first member.

11. The combination recited in claim 2 the surface of said washer facing said sleeve is inclined to cooperate with the portion of said sleeve defining said wedge.

* * * * *